United States Patent Office 2,720,444
Patented Oct. 11, 1955

2,720,444

METHOD FOR PREPARING BOROHYDRIDES OF ALKALI METALS

Mario D. Banus, Topsfield, and Robert W. Bragdon, Marblehead, Mass., assignors to Metal Hydrides Incorporated, Beverly, Mass., a corporation of Massachusetts No Drawing. Application May 5, 1954, Serial No. 427,872

10 Claims. (Cl. 23—14)

This invention relates to the preparation of borohydrides of the alkali metals.

The United States patent to H. I. Schlesinger and H. C. Brown No. 2,524,533 describes the preparation of borohydrides of the alkali metals. One method comprises reacting a dry alkali metal hydride and an alkyl borate. When sodium hydride is used the reaction is as follows:

$$4NaH + B(OCH_3)_3 \rightarrow NaBH_4 + 3NaOCH_3 \qquad (1)$$

This method is unsuitable for the commercial production of borohydrides of the other alkali metals because the cost of the other alkali metal hydrides is too high.

In our copending application, Serial No. 304,847, filed August 16, 1952, a method is described for producing potassium borohydride by reacting another potassium compound with sodium borohydride in a solvent for the latter. By properly selecting the potassium compound together with the solvent and the amount thereof, a reaction liquor is formed in which potassium borohydride is substantially insoluble and which contains the other products in solution. By using a compound of rubidium or cesium in place of the potassium compound the borohydrides of rubidium or cesium may be formed. This application proposed the use of the reaction mixture indicated in Equation 1 above as the source of sodium borohydride in the above method for producing borohydrides of potassium, rubidium or cesium. It also proposed water, methanol and mixtures thereof as suitable solvents.

When the reaction mixture indicated by Equation 1 above is dissolved in water a vigorous and hazardous reaction, particularly on an industrial scale, takes place with overheating due to the excess sodium hydride used to get rapid and complete conversion of the alkyl borate. The temperature reached often is sufficient to cause ignition of the evolved hydrogen. In accordance with the present invention, the reaction mixture of sodium borohydride and sodium alkoxide containing the excess sodium hydride is coated with an inert liquid hydrocarbon, such as a mineral oil, before being dissolved in water. The liquid hydrocarbon serves to control the reaction when the reaction mixture is dissolved in water. A similar advantage is obtained when other solvents for sodium borohydride are used either wholly or in part in place of water. After the coated reaction mixture has been dissolved, it is desirable to separate the solution from the immiscible inert liquid hydrocarbon before introducing the compound of potassium, rubidium or cesium.

In the preferred practice of the invention, sodium hydride first is produced as a finely divided dispersion in oil, such as "Nujol," or other inert liquid hydrocarbon. Thus, sodium metal and oil, with or without dispersing and hydriding accelerating agents such as alkyl soaps and colloidal carbon respectively, may be placed in a suitable agitator and heated at a suitable temperature for hydriding, such as between about 200° C. and 350° C., in the presence of hydrogen at atmospheric pressure or considerably higher. Agitation is continued until absorption of hydrogen ceases. Any agitator may be used, such as a turbine agitator, which is capable of breaking up the molten sodium metal into finely divided particles. Good results also have been obtained with a high-speed stirring device known as the Premier Dispersator. This device comprises a shaft capable of rotating at high speeds infinitely variable from 0 to 8000 R. P. M. or considerably higher depending upon the motor used. A hollow barrel-like body is fixed upon one end of the shaft and is provided with a plurality of narrow elongated slots in its side wall. The outer end of the hollow body is provided with an inlet passage. When the device is rotated, the liquor being treated is drawn into the interior of the body through this inlet passage and is discharged through the narrow elongated slots with high shearing forces.

The inert liquid hydrocarbon should have a boiling point greater than the temperature used in producing the sodium hydride dispersion and which is substantially free of unsaturated components and which has a viscosity of the order of that of lubricating oils. Illustrative examples of other inert liquids which may be used in place of Nujol are "Primol D," which is a refined high-boiling Esso mineral oil, and "Bayol 85" which is an Esso mineral oil not as highly refined as "Nujol" or "Primol D."

The finely divided dispersion of sodium hydride in oil may be transferred to an apparatus provided with a stirring device and a reflux condenser. The apparatus is heated to a temperature between about 240° C. and 300° C., preferably about 250° to 260° C., in the presence of an alkyl borate, such as methyl borate, while the dispersion is vigorously stirred. The resulting product is essentially a reaction mixture in oil of sodium borohydride and sodium alkoxide containing the excess sodium hydride. The sodium borohydride may be extracted from this product with a suitable solvent for sodium borohydride which is a non-solvent for the sodium alkoxide, and the oil used. Suitable solvents, for example, are liquid ammonia and ethylene diamine. The solvent may be removed from the resulting solution by evaporation to recover solid sodium borohydride. By preparing the sodium hydride in situ a controlled desired reactivity may be obtained.

When dry sodium hydride is reacted with methyl borate as described in Patent No. 2,524,533, the reaction mixture produced contains between about 13 to 16 percent of sodium borohydride by weight and 5 to 8 percent sodium hydride by weight. In contrast, when methyl borate is reacted with sodium hydride produced and dispersed in oil in accordance with the present invention, the reaction mixture produced contains about 18 percent of sodium borohydride by weight and 1 to 2 percent of sodium hydride by weight.

If a borohydride of potassium, rubidium or cesium is desired, a solvent is added to the reaction mixture in oil of sodium borohydride and sodium alkoxide containing the excess sodium hydride to form a solution. This solvent should be a solvent for both sodium borohydride and the sodium alkoxide and should have the other solubility characteristics mentioned hereinafter. If this solvent is immiscible with the liquid hydrocarbon, the latter may be separated from the solution of sodium borohydride and the sodium alkoxide if desired. If the solvent is water, either wholly or in part, the sodium alkoxide will decompose to sodium hydroxide and an alkyl alcohol which will be in solution. Preferred solvents are water, methanol and mixtures thereof. To the solution formed by adding one of these solvents to the above mentioned reaction mixture a soluble potassium, rubidium or cesium compound is added to precipitate the corresponding borohydride. Suitable compounds of potassium, rubidium and cesium are the hydroxide, acetate, iodide, bromide and an alkoxide. The potassium, rubidium or cesium compounds together with the solvent and the amount thereof are selected so that when the potassium, rubidium or cesium compound and the reaction mixture of sodium borohydride and sodium alkoxide are mixed with the solvent a liquor is formed in which the potassium, rubidium or cesium borohydride is substantially insoluble. The remaining portion of the liquor is a solution which, in addition to the solvent used, consists essentially of at least two compounds of the group consisting of sodium alkoxide, sodium hydroxide, an alkyl alcohol and the sodium compound corresponding to the potassium, rubidium or cesium compound used. The precipitated borohydride may be removed as by filtration.

It will be noted that in the preferred practice of the invention wherein the product desired is a borohydride of potassium, rubidium or cesium, the inert liquid hydrocarbon used in producing the dispersions of sodium hydride is utilized for coating the reaction mixture of sodium borohydride and the sodium alkoxide containing sodium hydride. It will be understood, however, that the reaction mixture of sodium borohydride and sodium alkoxide may be produced by other methods known to those skilled in the art and thereafter coated with an inert liquid hydrocarbon.

The method of the present invention has many advantages. The rate of formation of sodium hydride when produced by hydriding a dispersion of sodium metal in oil is substantially faster than in any previously known method for producing sodium hydride. The sodium hydride-oil dispersions are far easier to handle than any dry powdered sodium hydride of equivalent reactivity. These dispersions react with methyl borate about ten times faster than sodium hydride made by any previously known method and it is not necessary to use an excess of sodium hydride since the reaction can be conducted efficiently with stoichiometric amounts of sodium hydride and methyl borate or even with an excess of methyl borate. When dissolving the reaction mixture of sodium borohydride and sodium methoxide, the volume of oil absorbs the heat of the solution of sodium borohydride and the heat of the solution and reaction of sodium methoxide and any excess of sodium hydride thereby preventing the decomposition of sodium borohydride by overheating.

The invention is illustrated further by the following specific examples. In these examples, the sodium hydride was prepared in a 2-liter, 3-neck Morton flask. The two side necks served as gas inlet and outlet. The center neck served for entry of the stirrer shaft, of the Premier Dispersator previously described herein, through a graphited string packed gland. The sodium borohydride was prepared in a 4-liter stainless steel resin flask. The top of the latter flask was fitted with a reflux condenser, an inert gas inlet and outlet, methyl borate addition column and packed gland for entry of an anchor-type stirrer driven at about 200 R. P. M.

EXAMPLE 1

*Sodium hydride—Run 99*

In Run 99, 163 grams of sodium shaved clean from oxide in the dry box was added to 659 grams of Bayol-85 oil (Esso) in a Morton flask. The necessary connections were made to the flask, and it was heated under hydrogen. When the temperature reached 235° C. the stirrer was turned up to 7,600 R. P. M. Initial pick-up of hydrogen was observed at a temperature of 268° C. Twelve minutes later the temperature reached 300° C., which temperature was maintained for the duration of the run. Forty-seven minutes after the first pick-up of hydrogen was observed the rate of reaction reached a peak. The reaction was complete in 95 minutes, and and the product was cooled under argon. Analysis indicated a 100% conversion of the sodium to sodium hydride.

*Sodium hydride—Run 101*

In Run 101, 143 grams of sodium shaved clean from oxide in the dry box was added to 641 grams of Bayol-85 oil (Esso) in a Morton flask. The necessary connections were made to the flask and it was heated under hydrogen. When the temperature reached 145° C. the stirrer was turned up to 7,600 R. P. M. Initial pick-up of hydrogen was observed when the temperature reached 280° C., and the peak reaction rate was observed 35 minutes later. In 95 minutes the reaction was complete, so the product was cooled under hydrogen. Analysis indicated a 100% conversion of sodium to sodium hydride.

*Sodium borohydride—Run 49*

To 795 grams of the oil-coated sodium hydride of Run 99 above and 753 grams of the oil-coated sodium hydride of Run 101 above was added 1008 grams of Bayol-85 oil (Esso) in the resin-kettle sodium-borohydride reactor. After flushing with helium the temperature was rapidly brought to 250° C., where it was maintained while 340 grams of methyl borate was added in 85 minutes at a steady rate. After post-heating for 20 minutes the oil-coated reaction mix was cooled under helium. A sample was taken for analysis and showed the presence of 4.08% sodium borohydride, indicating a 95.6% yield based on methyl borate.

EXAMPLE 2

1348.1 grams of the oil-coated sodium borohydride reaction mixture of Run 49 (described in Example 1) was placed in a beaker and 350 grams of water cooled in an ice-water bath was added. This was stirred with a stirring rod until the solids had dissolved in the water. The water-reaction mix solution layer (bottom layer) was drawn off and filtered through a sintered glass filter. To this solution was added 179.6 grams of a 50% aqueous potassium hydroxide solution (10% excess potassium hydroxide) and stirred for twenty minutes. The potassium hydroxide solution was prepared by dissolving 118.0 grams of 85% potassium hydroxide (aqueous) in 112.0 grams of water and filtering. The potassium borohydride precipitate was filtered on a sintered glass filter and washed with three 100-gram portions of 95% ethanol and two 100-gram portions of ethyl ether. The potassium borohydride was dried in vacuo at 100° C. Yield, 66.2 grams; purity, 98.4% based on hydrogen evolution and percentage yield based on sodium borohydride contained 82.8%.

EXAMPLE 3

1196.2 grams of the oil-coated sodium borohydride reaction mixture of Run 49 (described in Example 1) was placed in a beaker and 800 grams of anhydrous methanol cooled in an ice-water bath was added. This was stirred for five minutes and allowed to stand for layer separation. The methanol-reaction mix solution (bottom layer) was drawn off. To the remaining oil was added 250 grams of anhydrous methanol and stirred. An emulsion was formed that could not be broken by centrifuging. 700 grams of hexane was added to decrease the specific gravity of the oil. A good layer split was obtained and the methanol layer was drawn off. The two methanol extractions were combined and filtered through a sintered glass filter. To this methanol-reaction mix solution was added 293.5 grams of a 27.1% potassium hydroxide-methanol solution (10% excess potassium hydroxide) and stirred for thirty minutes. The 27.1% potassium hydroxide-methanol solution was prepared by dissolving 93.5 grams of 85% potassium hydroxide in 200 grams of anhydrous methanol and filtering. The potassium borohydride precipitate was filtered on a sintered glass filter and washed with three 100-gram portions of 95% ethanol and two 100-gram portions of ethyl ether. The potassium borohydride was then dried in vacuo at 100° C. Yield, 63.8 grams; purity, 99.0% based on hydrogen evolution and the percentage yield based on sodium borohydride contained 90.5%.

We claim:

1. The method for preparing potassium borohydride which comprises agitating sodium metal in an inert liquid hydrocarbon in the presence of hydrogen at a temperature between about 200° C. and 350° C. thereby forming a dispersion of finely divided sodium hydride in said liquid hydrocarbon, adding an alkyl borate to said dispersion and agitating the dispersion while heating it at a temperature between about 240° C. and 300° C. thereby forming a reaction mixture consisting essentially of sodium borohydride and sodium alkoxide in said liquid hydrocarbon, selecting a potassium compound from the group consisting of the hydroxide, acetate, iodide, bromide and an alkoxide together with a solvent and an amount thereof selected from the group consisting of water, methanol and mixtures thereof such that when said potassium compound and said reaction mixture are mixed with the selected solvent a liquor is formed in which potassium borohydride is substantially insoluble and which contains dissolved therein at least two compounds selected from the group consisting of sodium alkoxide, sodium hydroxide, an alkyl alcohol and the sodium compound corresponding to said potassium compound, mixing said reaction mixture with the selected amount of the selected solvent to form a solution, mixing the selected potassium compound with said solution thereby precipitating potassium borohydride in the resulting liquor, and separating the precipitated potassium borohydride.

2. The method as described by claim 1 in which the alkyl borate is methyl borate.

3. The method as described by claim 2 in which said liquid hydrocarbon is removed from said solution before mixing said potassium compound with said solution.

4. The method as described by claim 3 in which the potassium compound is potassium hydroxide.

5. The method as described by claim 3 in which the potassium compound is a potassium alkoxide.

6. The method for preparing potassium borohydride which comprises adding an alkyl borate to sodium hydride and heating it at a temperature between about 240° C. and 300° C. thereby forming a reaction mixture consisting essentially of sodium borohydride and sodium alkoxide, coating said reaction mixture with an inert liquid hydrocarbon, selecting a potassium compound from the group consisting of the hydroxide, acetate, iodide, bromide and an alkoxide together with a solvent and an amount thereof selected from the group consisting of water, methanol and mixtures thereof such that when said potassium compound and said reaction mixture are mixed with the selected solvent a liquor is formed in which potassium borohydride is substantially insoluble and which contains dissolved therein at least two compounds selected from the group consisting of sodium alkoxide, sodium hydroxide, an alkyl alcohol and the sodium compound corresponding to said potassium compound, mixing the coated reaction mixture with the selected amount of the selected solvent to form a solution, mixing the selected potassium compound with said solution thereby precipitating potassium borohydride in the resulting liquor, and separating the preciptated potassium borohydride.

7. The method as described by claim 6 in which the alkyl borate is methyl borate.

8. The method as described by claim 7 in which said liquid hydrocarbon is removed from said solution before mixing said potassium compound with said solution.

9. The method as described by claim 8 in which the potassium compound is potassium hydroxide.

10. The method as described by claim 8 in which said potassium compound is a potassium alkoxide.

No references cited.